April 25, 1939. A. KORSMO ET AL 2,155,423
COMBINE
Filed Dec. 20, 1937 2 Sheets-Sheet 1

INVENTORS
ALFRED KORSMO
MARTIN RONNING
BY
ATTORNEY.

April 25, 1939.  A. KORSMO ET AL  2,155,423
COMBINE
Filed Dec. 20, 1937   2 Sheets-Sheet 2

INVENTORS
ALFRED KORSMO
MARTIN RONNING
BY
Andrew E. Carlsen
ATTORNEY.

Patented Apr. 25, 1939

2,155,423

UNITED STATES PATENT OFFICE 2,155,423

COMBINE

Alfred Korsmo, Hopkins, and Martin Ronning, St. Louis Park, Minn., assignors to Minneapolis-Moline Power Implement Company, Minneapolis, Minn., a corporation of Delaware Application December 20, 1937, Serial No. 180,780

REISSUED

10 Claims. (Cl. 198—213)

This invention relates to improvements in combination harvester-threshers, commonly termed "combines", and more specifically to improvements in the apparatus used to convey the cut grain or crop from the harvesting elements of the machine to the threshing or separating mechanism thereof. The invention further contemplates improvements in the type of the machine shown in the Martin Ronning (one of present applicants) United States Patent No. 1,959,689, granted May 22, 1934 for Combines and particularly this invention improves the grain conveying apparatus as disclosed in our co-pending application for United States Patent, Serial Number 124,650, filed February 8, 1937, also for Combines. Reference is invited to this patent and application for comparative purposes.

In the type of machine here in mind considerable difficulty has been experienced in properly conveying the cut grain from the harvesting sickle to the conveyor leading to the threshing elements of the machine, in that the grain has had a tendency to bunch and jam at the point at which it is transferred to the conveyor. It is of course of advantage, and in fact necessary, that the grain be distributed evenly over this conveyor as it enters the harvesting mechanism. This jamming difficulty has been further aggravated by the fact that the crop of grain varies greatly in density over different parts of the field and from one field to another.

It is the primary object of our invention, therefore, to provide an apparatus of a simple and practical nature which will carry the cut grain from the harvester elements of the machine and transfer it smoothly and evenly to the conveyor leading to the threshing mechanism and in such manner that the grain will not become bunched or jammed at the transfer point even when working in the heaviest crops. Other more specific objects and advantages of our invention will be pointed out in detail in the course of the following specifications reference being had to the accompanying drawings, wherein.

Figure 1:
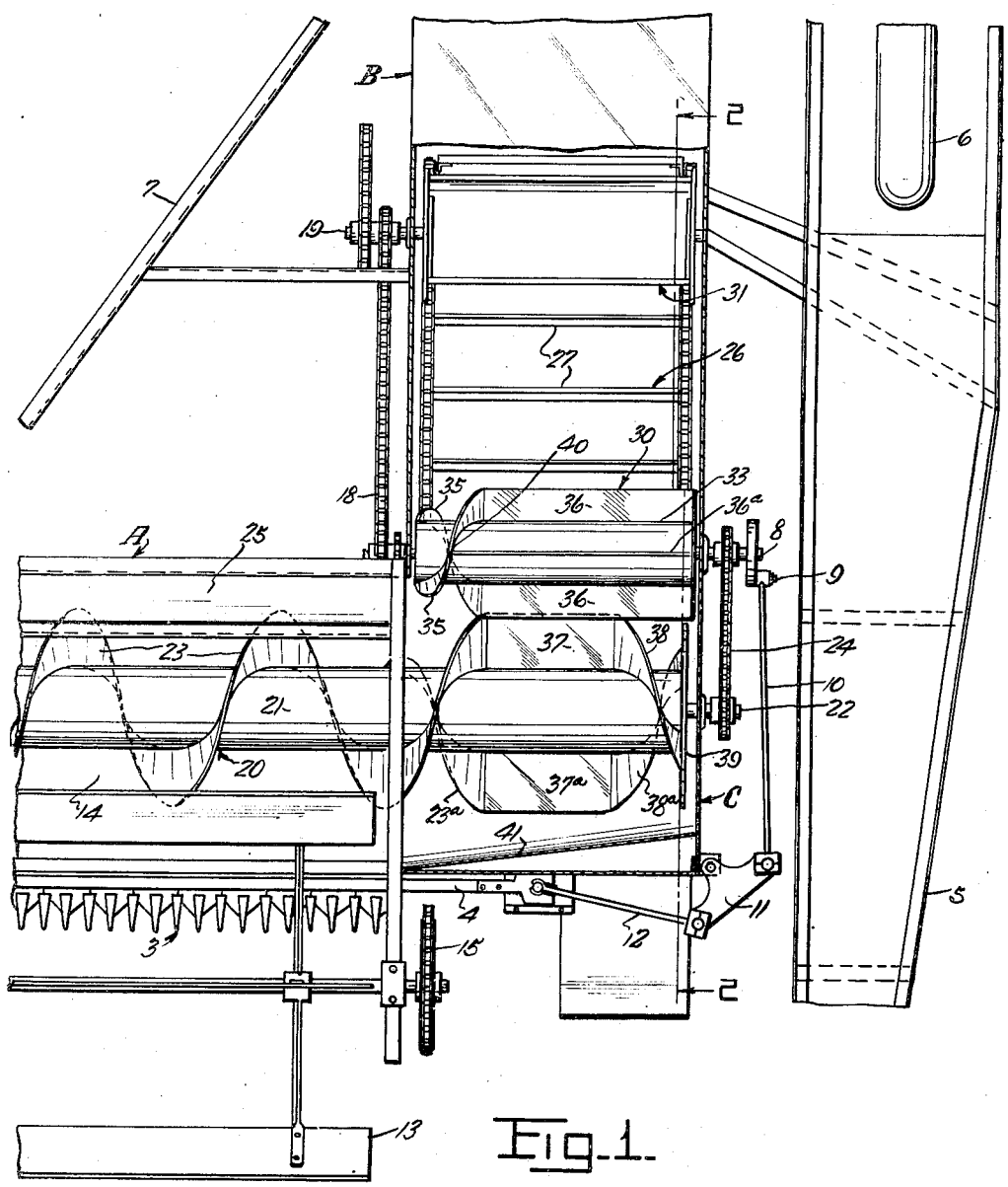
Figure 1 is a plan view of a portion of a harvester-thresher or combine embodying our invention, with fractional parts broken away and others shown in section to better illustrate the construction.

Referring now with more particularity to the drawings the reference character A designates the harvester mechanism, B the separator mechanism and housing and C the feeder housing into which the cut grain is fed laterally from the harvester and from which the grain is transferred rearwardly into the separator mechanism. This structure generally is of the well known type disclosed in Ronning Patent No. 1,959,689 hereinbefore referred to.

The harvester mechanism A includes the sickle or cutter mechanism 3 having the cutter bar 4 for heading the grain as the machine moves forwardly over the field. The machine, of course, includes the draft frame 5 supported by wheels, one of which is shown at 6, so that the machine may be drawn over the field, and the implement frame 7 which supports the harvesting and separating mechanism and is tiltably supported on the draft frame. The said cutter bar 4 is actuated from the shaft 8 through an eccentric 9, connecting rod 10, oscillating bell crank 11 and a pitman 12 in the manner clearly shown. A reel 13 operates to guide the standing grain into the sickle mechanism 3 and thereafter to impel the cut heads rearwardly onto the receiving platform 14. The reel is suitably supported as shown and is driven by sprocket chains 15, 16 and 17, and suitable sprockets, from the shaft 8. This shaft 8 is in turn driven by the chain 18 and shaft 19; and this shaft 19, like the grain auger, raddle conveyor and other feed elements shown, is driven by power transmitting devices of any suitable kind and here unnecessary of description.

Figure 2:
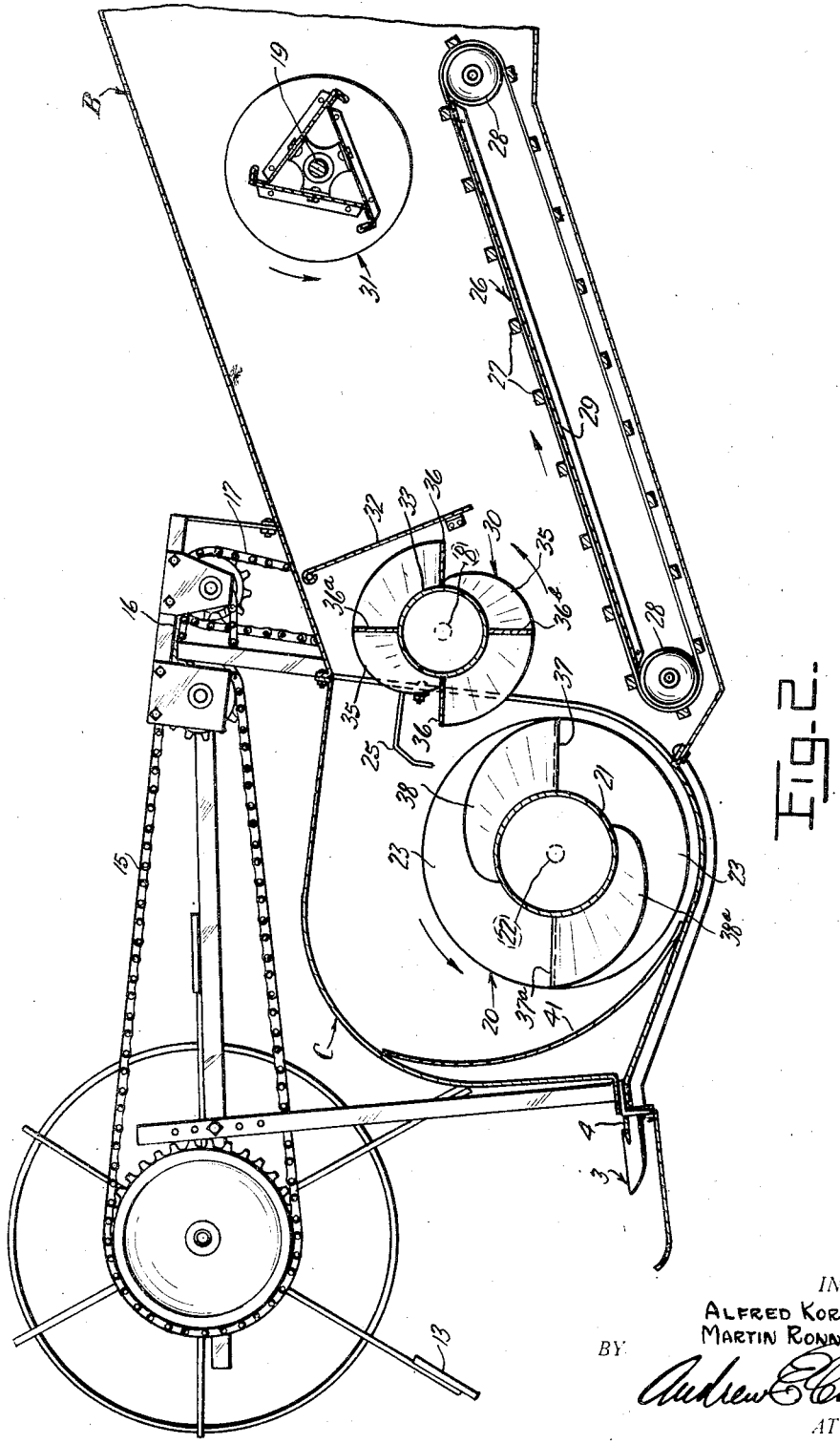
Figure 2 is an enlarged sectional elevation along the line 2—2 in Figure 1.

As the grain cut by the sickle mechanism 3 is impelled back over the platform 14 by the reel 13 it is engaged by the comparatively large feed auger or screw conveyor 20 which is disposed transversely and operates to carry the grain laterally into the feeder housing C. This auger 20 comprises the elongated tube 21, end stub shafts 22 and spiral vanes 23 and the auger is rotated by means of the sprocket mechanism 24 from the shaft 8. The direction of rotation is counterclockwise as viewed from the delivery end of the auger (Figure 2) and in order to prevent the cut grain from wrapping around the auger and insure movement of the grain longitudinally into the feeder housing we provide the guard 25 in substantially the same manner as is indicated at 145 in the Patent No. 1,959,689.

As the grain is moved into the feeder housing C under this action of the auger 20 it is intended to be transferred to the separator conveyor 26 for movement rearwardly into the separating housing B. This conveyor is of the raddle type including the endless series of raddle slats 27 which travel about the rollers 28 and move the grain upwardly and rearwardly over the inclined table 29.

It is of importance that the grain be distributed evenly over the conveyor 26 in order that it will be transferred thereby to the separating cylinders (not shown) in an even and uniform flow, and for this purpose the crop delivered to the conveyor is subjected to the operation of two feeder-beaters 30 and 31 and a metal curtain or baffle 32. These feeder-beaters 30 and 31 are rotated by the sprocket chain 18 and the one, 31, is substantially the same as that indicated at 55 in the aforesaid Ronning Patent No. 1,959,689. It will be noted however that the other beater, shown at 54, in this patent is of the same type and projects forwardly to such extent that it is necessary to provide a curved guard at the intake of the thresher to prevent the cut grain carried by the screw conveyor from contacting the end of this beater. This structure resulted in a congestion of the grain at this point such as would often jam the conveyor. In the effort to overcome this disadvantage in our co-pending application, Serial Number 124,650, we provided a feeder-beater assembly which not only would have a beating or slapping action on the grain but also had a tapered auger portion which engaged the moving grain and pulled it into proper feeding position with respect to the conveyor 26. This structure operated very effectively for its specific purpose and is accordingly employed on our present assembly, with modification as hereinafter pointed out. Specifically then, the feeder-beater 30 comprises the elongated tube 33 fixed on the shaft 8 alongside and rearwardly of the delivery end of the screw conveyor 20 and carrying the tapered helical auger vanes 35 terminating in straight radially extended blades 36.

Referring again specifically to the screw conveyor 20, in our previous arrangement of this device (disclosed in our co-pending application referred to) it was found that the continuous screw action of this conveyor resulted in the carrying of the cut grain in large quantities clear over to the side wall of the feeder housing C. As a result, the grain bunched at this point and it was found to be very difficult, if not impossible, to redistribute the grain so that it would come to rest evenly across the entire width of the raddle conveyor 26. Particularly was this true in heavy crops where the amount of grain handled was very large. In accordance with our present invention, therefore, we terminate the screw vane 23 in a straight radially disposed paddle blade 37 which is of such size and position as to operate in alignment with a substantial medial portion of the conveyor 26. From the blade 37 then to the end of the tube 21, a reversely or oppositely turned helical vane 38 extends and terminates finally against the end disk 39. At a point diametrically opposite the blade 37, another similar blade 37a is secured to the tube 21 and from its ends extend the complementing reversely turned helical vanes 23a and 38a as shown.

As a result of this arrangement of the screw conveyor the cut grain cannot be carried to the end of the housing C but instead meets the reversely acting vanes 38 and 38a which work the excess grain back and cause the grain to be evenly distributed along the length of the blades 37 and 37a to be moved thereby to the conveyor 26. This action transfers the grain to the conveyor in a wide stream at the center of the conveyor and greatly facilitates the proper, uniform distribution of the grain on the conveyor as will be readily evident. The action is further facilitated by the curved front wall 41.

For cooperating with this "center delivery" of the screw conveyor 20 the feeder-beater 30 has its blades 36 extended in length so as to operate alongside the entire length of the conveyor blades 37 and 37a and thereby operate in conjunction with these blades to urge the grain down onto the conveyor 26 as desired. The screw portion 35 of this feeder beater then operates alongside the screw vanes 23 and 23a to guide a part of the grain onto the conveyor in the manner pointed out in our aforesaid prior application. The feeder-beater however is now provided with additional, diametrically opposed and radially extended beater blades 36a and 36b which are spaced evenly between the blades 36 and, adjacent the receiving end of the assembly, are secured at 40 to the vanes 35. The increased beating action afforded by these blades 36a and 36b has been found of considerable benefit in properly distributing the grain over the conveyor 26.

From the foregoing it will be apparent that we have provided an apparatus which will operate to properly convey and distribute the grain and which will prevent any bunching or jamming of the grain at any point. It is understood that suitable modifications may be made in the structure as disclosed, provided such modifications fall within the spirit and scope of the appended claims.

Having now therefore fully illustrated and described our invention, what we claim as new and desire to protect by Letters Patent is:

1. In a combine, a conveyor device for transferring grain from the cutter to the separator conveyor, a feed screw for initially conveying the grain from the cutter and having a helical vane leading toward the said separator conveyor, the said vane terminating first in a straight beater blade in alignment with the transverse central portion of the separator conveyor and then in a reversely turned helical vane extended to the extremity of the screw, and another beater blade located oppositely to the first mentioned blade and terminating in reversely turned and oppositely extending helical vanes extended along the feed screw.

2. In a combine, a conveyor system for transferring grain from the cutter to the separator and comprising a feed screw for initially conveying the grain from the cutter, a conveyor leading to the separator and receiving the grain from the feed screw, the said feed screw having beater blades operating over the transverse central portion of the said conveyor and terminating in oppositely extended and reversely turned helical vanes, and a separate rotary device having screw acting means at one end and having radially extending beater blades operating adjacent the beater blades of the feed screw.

3. In a combine, a conveyor system for transferring grain from the cutter to the separator and comprising a conveyor leading to the separator, a feed screw having helical vanes for initially conveying the grain to the said conveyor, the said vanes terminating in longitudinally extended beater blades and in reversely turned helical vanes at the extremity of the screw, the said beater blades being located adjacent a transverse medial portion of the said conveyor, a separate rotary device having screw acting means for receiving grain from the feed screw and also having radially extended blades operating adjacent the beater blades of the feed screw and over the greater portion of the width of the said conveyor.

4. In a combine, a conveyor system for transferring grain from the cutter to a conveyor leading to the separator and comprising a feed screw having straight beater blades operating over the medial transverse portion of the conveyor, the said feed screw also having reversely turned helical vanes extending oppositely from the beater blades along the length of the feed screw to thereby feed the grain from the cutter toward the conveyor and discharge the grain from the said beater blades, and a separate rotary beater device including a plurality of beater blades operating over the conveyor and adjacent the beater blades of the feed screw, and screw acting means on the beater device for reception of grain from the feed screw.

5. In a combine, a conveyor system for transferring grain from the cutter to a conveyor leading to the separator and comprising a feed screw having longitudinally extended radial beater blades disposed in alignment with a medial portion of the conveyor, the said screw having a helical feeding vane leading to the blades and operating for initially conveying the grain thereto, the said blades terminating in oppositely turned reversely feeding vanes for restraining the grain against movement beyond the beater blades, and a separate rotary beater device having radial beater blades operating adjacent to the beater blades and reversely feeding vanes of the feed screw.

6. In a combine, a conveyor system for transferring grain from the cutter to a conveyor leading to the separator and comprising a feed screw having longitudinally extended beater blades disposed in alignment with a medial portion of the conveyor, the said screw having a helical feeding vane leading to the blades and operating for initially conveying the grain thereto, the said blades terminating in oppositely turned reversely feeding vanes for restraining the grain against movement beyond the beater blades, a separate rotary beater device having a pair of radial beater blades operating adjacent the beater blades and reversely feeding vanes of the feed screw, the said beater blades of said device terminating in screw acting vanes disposed alongside the feeding vanes of the feed screw to receive grain therefrom, and auxiliary beater blades disposed radially on the beater device between the first mentioned blades and secured at their extremities to the said vanes thereon.

7. In a combine, a conveyor system for transferring grain from the cutter to the separator and comprising a feed screw for initially conveying the grain from the cutter, a conveyor leading to the separator and receiving the grain from the feed screw, the said feed screw having beater blades operating over the transverse central portion of the said conveyor and terminating in oppositely extended and reversely turned helical vanes, a separate rotary beater device having a pair of beater blades operating adjacent the beater blades of the feed screw, the said beater blades of the beater device terminating in helical vanes for receiving grain from the feed screw, and auxiliary blades radially extended from the beater device and secured at their extremities to the said vanes thereon.

8. In a combine, a conveyor system for transferring grain from the cutter to the separator conveyor, comprising a feed screw for conveying the grain from the cutter and having a helical vane leading toward the conveyor, the said vane terminating first in a straight radially extended beater blade adjacent the conveyor and then in a reversely turned helical vane, and beater means operating adjacent the beater blade for transferring grain from the beater blade to the conveyor.

9. In a combine, a conveyor assembly for transferring grain from the cutter to the separator conveyor, the same comprising a feed screw for initially moving the cut grain toward the conveyor, the said screw including a helical vane feeding toward the conveyor and terminating in a straight, longitudinally disposed beater blade and in a helical vane feeding in the opposite direction, and a rotary beater device operating alongside the said beater blade for transferring grain to the conveyor.

10. In a combine, a conveyor device for transferring grain from the cutter to the separator conveyor, comprising a feed screw for initially moving the grain from the cutter and having a helical vane feeding the grain toward the conveyor, the said vane terminating first in a longitudinally extended straight beater blade operating adjacent the conveyor and then in a reversely turned helical vane feeding in the opposite direction, and another beater blade located oppositely to the first mentioned blade and terminating in reversely turned and oppositely extending helical vanes.

ALFRED KORSMO.
MARTIN RONNING.